March 9, 1954  C. W. VOGT  2,671,382
APPARATUS FOR PRODUCING ENWARPMENTS IN SERIES
Filed Feb. 14, 1949  3 Sheets-Sheet 1
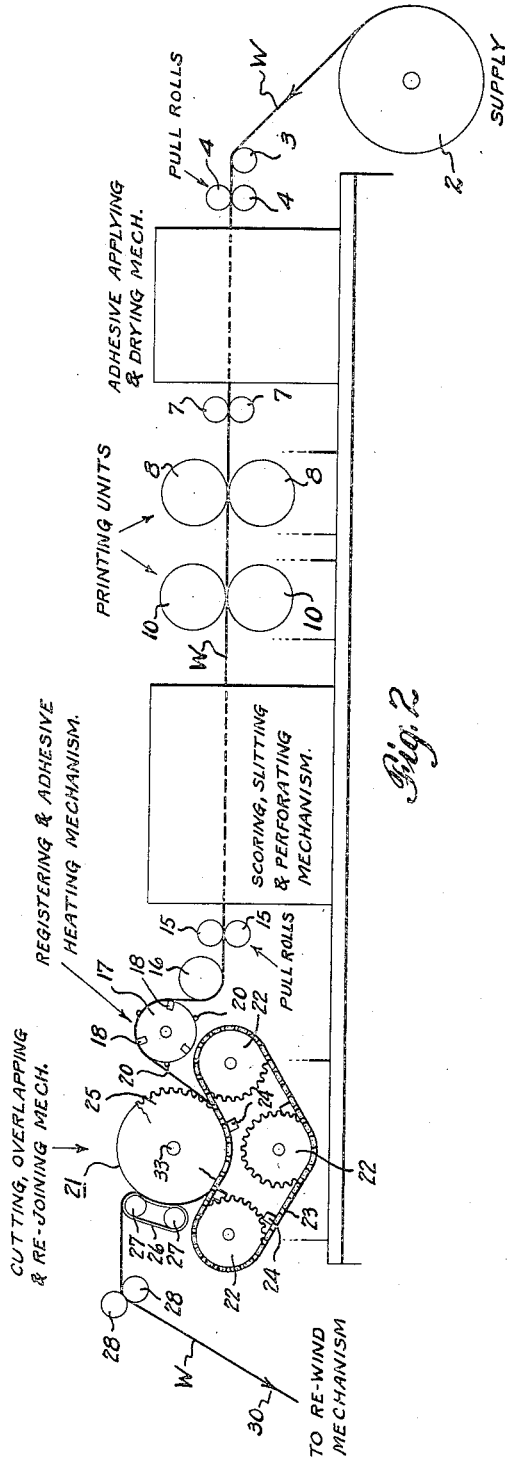
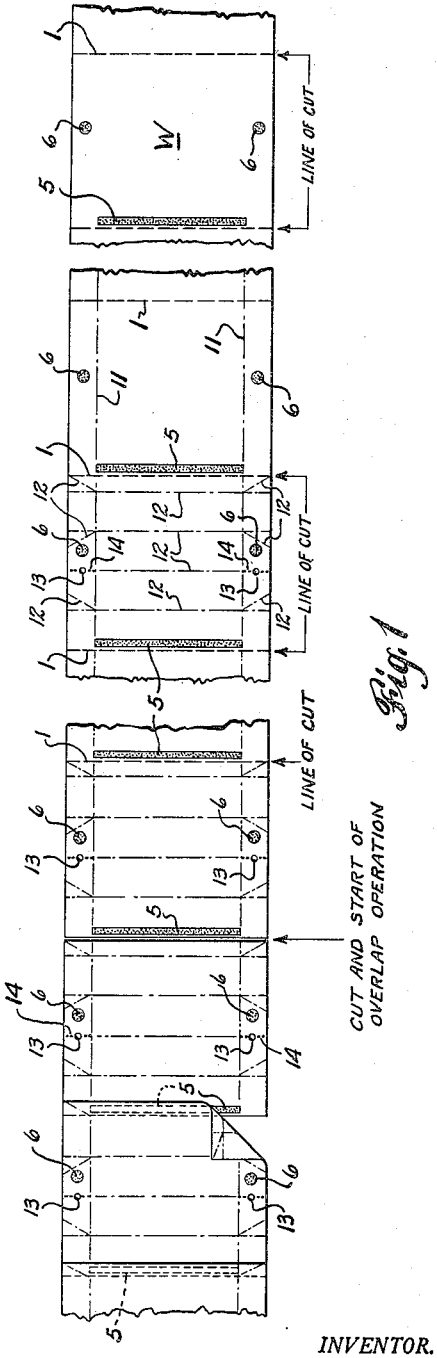
INVENTOR.
CLARENCE W. VOGT
BY
ATTORNEY.

March 9, 1954     C. W. VOGT     2,671,382
APPARATUS FOR PRODUCING ENWARPMENTS IN SERIES
Filed Feb. 14, 1949     3 Sheets-Sheet 2
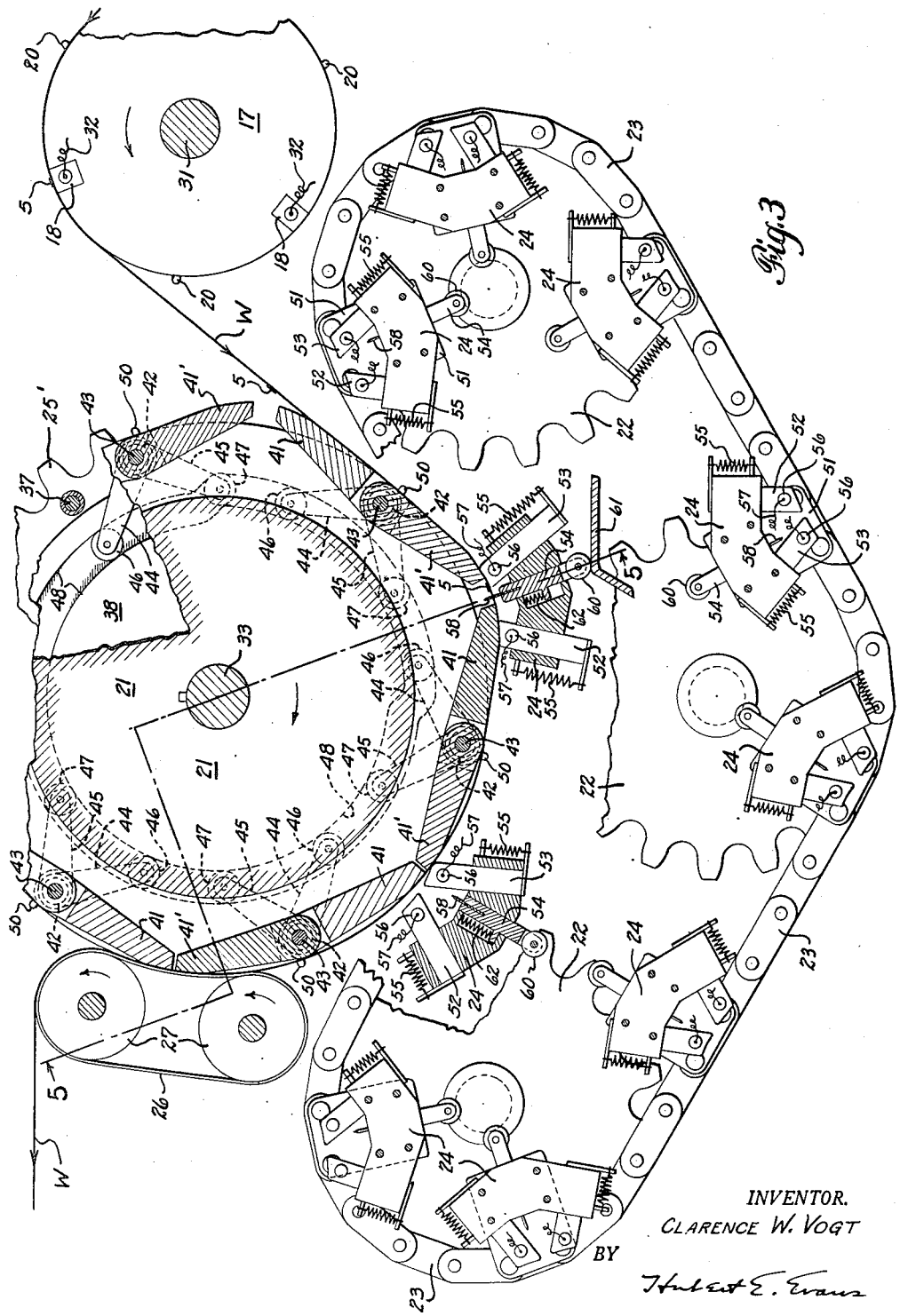
INVENTOR.
CLARENCE W. VOGT
BY
Hubert E. Evans
ATTORNEY.

March 9, 1954  C. W. VOGT  2,671,382
APPARATUS FOR PRODUCING ENWARPMENTS IN SERIES
Filed Feb. 14, 1949  3 Sheets-Sheet 3

INVENTOR.
CLARENCE W. VOGT
BY
Hubert E. Evans
ATTORNEY.

Patented Mar. 9, 1954

2,671,382

UNITED STATES PATENT OFFICE 2,671,382

APPARATUS FOR PRODUCING ENWRAP-
MENTS IN SERIES

Clarence W. Vogt, Norwalk, Conn.

Application February 14, 1949, Serial No. 76,338

8 Claims. (Cl. 93—1)

This invention relates to a method of and apparatus for manufacturing enclosures or enwrapments for various commodities and in particular relates to the manufacture of a series or chain of connected individual enwrapments.

It is an object of the present invention to provide a method of and apparatus for fabricating individual enwrapments from a continuous web of integrally connected enwrapments with a detachable connection between adjacent enwrapments in the series so that such individual enwrapments may be readily separated from the series.

Another object is to provide a method of and apparatus for producing a connected series of individual enwrapments, which enwrapments have been fabricated in advance to incorporate one or more means for simplifying the use of such enwrapments in packaging commodities.

Another object is to provide a method of and apparatus for fabricating a series of individual enwrapments in which the common boundary between adjacent enwrapments is defined or determined while such enwrapments are held in registry, whereby each enwrapment may be uniform in size and shape with respect to the balance of the enwrapments. Further, in so doing, the individual enwrapments may be successively advanced to wrapping position while maintained precisely in registry with the means for advancing the commodity to be packaged.

A still further object is to provide a method of and apparatus for producing individual enwrapments connected in a series or chain which permits defining the individual enwrapments in precise registry with imprinting or fabricating operations to which the wrappers may be subjected.

Another object is to provide a method of and apparatus for fabricating individual enwrapments which are detachably connected in a series from a web of integrally connected enwrapments by advancing such web and supporting it at spaced points on opposite sides of the predetermined location of a common boundary between adjacent individual enwrapments, and defining such common boundary while the web is supported at such spaced points.

A further object is to provide a method of and apparatus for producing a series of detachably connected individual enwrapments by defining such individual enwrapments from a continuous web, utilizing mechanism which may be continuously operated and will operate in synchronization with the continuously moving web.

It is believed that this will facilitate precise registry of all operations performed on the web by avoiding stopping and starting of the various mechanisms acting on the web.

Other objects and advantages will become apparent from the following detailed description accompanied by the drawings in which:

Figure 1 is a developed plan view of one form of enwrapments embodying the present invention and illustrating the sequence of operations which occur in the manufacture of a series of detachably connected individual enwrapments;

Fig. 2 is a diagrammatic elevational view of a mechanism for fabricating a connected series of individual enwrapments;

Fig. 3 is an enlarged fragmentary view, partially in section, showing in semi-diagrammatic form, one mechanism which may be utilized to define the individual enwrapments from a continuous web;

Figure 4:
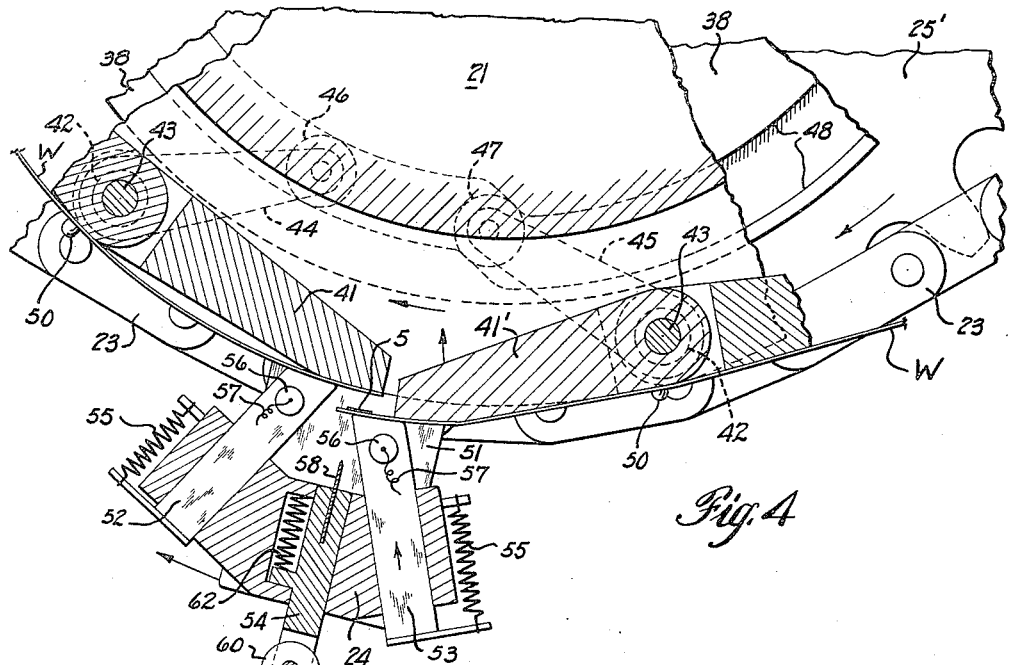
Fig. 4 is an enlarged fragmentary sectional view of a portion of the apparatus shown in Fig. 3 to illustrate the details of its operation.

This application relates to the subject matter referred to in my copending applications, Serial No. 41,384, filed July 29, 1948, now U. S. Patent No. 2,626,544 and entitled Apparatus for and Process of Manufacturing Enwrapments; Serial No. 56,941 filed October 28, 1948, entitled Apparatus for and Method of Chaining Enwrapments; Serial No. 73,295 filed January 28, 1949, entitled Chained Enwrapments; and, Serial No. 56,942 filed October 28, 1948 and entitled Wrappers.

In illustrating a preferred embodiment of the present invention, the individual enwrapments to be fabricated are shown as sections or pieces of sheet material which may be imprinted with means for facilitating the wrapping or formation of completed packages such as, for example, wrappers useful for packaging blocks of butter, margarine, ice cream, lard, etc. Examples of these enwrapments are the subjects of my copending applications Serial No. 73,295 and Serial No. 56,942 referred to above. It will be understood many other forms of enwrapments may be produced in accordance with the present invention. By way of illustration the web of material may comprise a web of seamless or seamed tubing, or may be sheet material having folded portions, pleats, or the like.

Wrappers of the type disclosed in the drawings are at present usually passed through a printing machine while in a continuous web and suitably provided with advertising and/or labeling information which appears thereon as a repeated pattern. To utilize the web, it is then cut into a series of separate individual blanks which may be stacked and fed to wrapping position or the web may be fed to wrapping position and severed into individual lengths at the time the commodity to be packaged is associated with the wrapper. Due to the difficulties of maintaining precise registry of the individual wrapper with the commodity to be packaged, the design or printing matter is repetitive and appears as a pattern. Further, the design or printing matter is dimensioned and positioned so that in a distance corresponding to the average length of an individual wrapper, two or more repetitions of the pattern are disposed. In this way each wrapper will contain at least one full pattern irrespective of the point where it may be severed from the web. The difficulties of handling and feeding independent, separate wrappers, and the problem of properly positioning a continuous web at the wrapping position require that wrappers fabricated in this manner may be longer than is necessary if it is desired to be sure of completely enclosing a commodity. The present invention offers a solution to these objections.

In accordance with the present invention, the web of integral enwrapments may be provided with printed matter, score lines, fold lines, pleats, slits or tear lines, cut score lines, registry indicia, adhesive stripes or areas, or other packaging aids which serve to simplify packaging and/or sealing apparatus or operations. It is also contemplated that sections of sheet material, cards, tabs, or other similar elements may be applied to the web to produce enwrapments with stiffening or reinforcing means, quick-opening devices for the completed package, etc. However, embodiments of the present invention are designed to maintain precise alignment of the web so that when the individual enwrapments are defined and later separated from the web for use in packaging, each wrapper may be of uniform size and bear the design of printed material, packaging aids, etc., in the same locations. Therefore, when such wrappers are advanced in registry to wrapping position, they may be only of the exact size needed, permitting an appreciable savings in the amount of material required to produce the enwrapments. At the same time all of the packages produced from the enwrapments will be uniform since each carries its full quota of printed matter, packaging aids, etc.

The defining of the enwrapments into individual wrappers may be accomplished in any suitable manner provided that precise registry is maintained during the defining operations. For example, the drawings illustrate a complete severance of the web and the overlapping and securing together of the marginal edges of adjacent wrappers in the region of the severance. The apportionment or sub-division of the web into individual wrappers may also be accomplished by partially severing the web at the common boundary between adjacent wrappers leaving integral connecting portions at any desired spacing along the line of severance. Sufficient material should be severed to permit a ready separation of the individual wrappers from the series or chain by tension alone or by a mechanism which will operate without disturbing the wrappers sufficiently to affect their registry. By way of illustration, partial severance may be accomplished by forming a plurality of slits along the line of severance and individual enwrapments may then be separated from the series by a means which enters the slits and exerts force transversely of the web and not longitudinally thereof to minimize any effect on the individual enwrapments.

Obviously, other connections or chaining means may be utilized to detachably connect the individual wrappers into the series. For example, sections, elongated strips, or tabs may be applied across the severance between adjacent wrappers and secured to each of the wrappers by a reactivatable adhesive material which will securely adhere the wrappers in the series but which will permit ready detachment of the individual wrappers from the series.

Figure 1 shows a developed plan of the sequence of operations which may be performed to fabricate the wrappers in a connected series. The letter W indicates a web of integrally connected wrappers and in the right hand portion of Figure 1 the web is indicated as being a section of sheet material of the proper width to provide a single series of wrappers. In Figure 1 the location of the common boundary between adjacent wrappers is indicated by dash lines bearing the reference numeral 1 and entitled "line of cut." Fig. 2 is a diagrammatic view of apparatus for carrying out the present invention, with the various operations being accomplished at stations therealong. Figs. 1 and 2 have been drawn to correspond so that the operations which occur at each station may be clearly indicated.

In Fig. 2 a supply roll of suitable sheet material is indicated by the numeral 2 and the web W may be withdrawn therefrom, passing around an idler roll 3 and between a pair of feed or pull rolls 4 which may be driven in any suitable manner and serve to withdraw the web and advance it. At the first station the web may have applied thereto, spots or stripes or areas of adhesive material and these may be applied to either or both sides of the web at locations which may be desired according to the function that the adhesive areas are to perform. It is generally desirable to pass the web through suitable drying means to dry the applied adhesive so that it will not be removed or altered in traveling through succeeding operations. In Fig. 2 specific adhesive applying and drying means are not shown since such means are conventional and are well known in the art.

As shown in Fig. 1 a stripe of adhesive 5 and a pair of adhesive spots 6 are shown as having been applied at the station indicated by the title "Adhesive Applying and Drying Mechanism." After the adhesive stripe 5 and the adhesive spots 6 have been applied to the web at the desired location, the web may pass through another set of feed rolls 7 and thence pass between sets of printing rolls 8 and 10 at the stations indicated in Fig. 2 by the title "Printing Units."

For ease of illustration the printing or advertising material has not been indicated on the web in Fig. 1. Although only two sets of printing rolls 8 and 10 have been shown in Fig. 2, it will be understood that additional printing is merely a repetition of the stations where printing is accomplished and any desired number of printing stations may be utilized. The design and construction of satisfactory printing mechanism is conventional and well known in the art. The amount of printing may be varied as desired and in some cases as many as six colors may be applied to the web of integrally connected enwrapments. It is also generally customary to provide drying means (not shown) to dry the printed matter applied to the web so that it will not be smeared or transferred on contact of other mechanism with the web. Further, additional means may be necessary to permit applying printed matter to both sides of the web according to the desired appearance of the finished enwrapments.

Following the application of the printed matter or advertising material the web may next pass to a station where any desired fold lines, crease lines, cut score lines, tear lines, slits, perforations or other fabrications may be incorporated in or applied to the web. Fig. 2 diagrammatically indicates this station by the title "Scoring, Slitting and Perforating Mechanism." Detailed structures for accomplishing these operations are also well known in the art. In Fig. 1 the web is illustrated as having applied thereto, longitudinally extending fold or crease lines 11 followed by transversely extending fold lines 12. At this same station suitable registry indicia such as perforations 13 may be formed in the web as well as cut score or tear lines 14. If desired, the perforations or registry indicia may be applied to the web as it leaves the supply roll in which case the web may be indexed throughout its entire travel past the stations indicated in Fig. 2.

After leaving the scoring, slitting and perforating mechanism, the web may again pass through a pair of feed rolls 15 and then may be advanced to the station where individual wrappers will be defined in the web by the formation of a readily detachable connection at the common boundary between adjacent wrappers. In the form of the invention shown in the drawings, the defining mechanism comprises means for severing the web along the lines of cut 1 and causing the adjacent marginal portions to be overlapped. In this position the adhesive stripes 5 may be utilized to detachably connect the overlapped portions of the individual wrappers together. It is believed preferably to utilize an adhesive of the thermoplastic type which may be heat activated to cause adherence.

The overlapping of the marginal portions of individual wrappers, following severance, which effects a shortening of the web, may be accomplished by passing the web around the periphery of a rotary member with means for causing the web to deviate from the normal periphery for a distance equal to the amount of overlap desired. With the web in this position, severance may be effected, following which the deviation in the web may be removed and the overlap formed. With the adhesive activated to tacky condition, the overlapped portions may be secured together and a series of connected individual wrappers is produced. Preferably the series is then rewound to form a supply roll from which the wrappers may be withdrawn for use. The supply roll may be transferred to the point of use and upon connection to the packaging machinery the individual wrappers may be advanced to wrapping position in synchronization or registry with the mechanism for delivering the commodity to be wrapped. At the wrapping position the adhesive stripes 5 may be heated to reactivate the adhesive and in this condition the individual wrappers may be readily slipped or peeled from the series for use in enclosing the commodity. It may be noted that the adhesive stripe 5 disposed on each wrapper may be overlapped with the opposite marginal edge of the wrapper to form a seam when the wrapper is formed into a tubular enwrapment around the commodity being packaged.

The use of a connected series of wrappers is more fully disclosed in my copending applications, Serial No. 71,195 filed January 15, 1949, and entitled Method of and Apparatus for Producing Packaged Units of Commodities; and Serial No. 100,065, filed June 18, 1949, and entitled Forming and Depositing Masses of Plastic Materials.

The mechanism for accomplishing the severance, overlapping, and the provision of a readily detachable connection is illustrated in Fig. 2 as an additional station through which the web may pass. Such station is entitled, "Cutting, Overlapping, and Rejoining Mechanism." After leaving the pull rolls 15, the web may travel around a guide or idler roll 16 and around an appreciable part of the periphery of a roll 17 denoted in Fig. 2 as "Registering and Adhesive Heating Mechanism." This roll 17 is provided with heated sections indicated by the numeral 18 at spaced peripheral locations adapted to properly register with the adhesive stripes 5 provided on the web. These sections 18 may be suitably insulated from the balance of the periphery of the roll so that heat will only be applied in the region of the adhesive areas. The roll 17 may also be provided with projections or pins 20 located to correspond with the perforations 13 which have been imprinted in the web. The pins 20 facilitate the precise registry of the wrappers during their advancement through the station where individual wrappers are defined from the web.

After leaving the roll 17 the web passes around a portion of the periphery of a drum or rotor 21. Disposed adjacent the drum 21 are a plurality of sprockets 22 which carry a pair of spaced chains 23. Mounted between the chains are a plurality of members or blocks 24 which move for a portion of their travel adjacent the periphery of the drum 21. These blocks 24 carry mechanism for severing and assisting in the formation of the overlap, and to facilitate precise registry of the severed mechanism the chains 23 are preferably driven by a pair of sprockets 25 and 25' which are connected to and driven simultaneously about the same axis of rotation as the drum 21. After the severance and overlapping has been accomplished it may be desirable to insure that the overlapped portions properly adhere to each other and for this purpose an endless belt 26 may be provided. The belt 26 is entrained around a pair of pulleys 27 and may be driven thereby or may be freely rotatable. The belt 26 moves with the periphery of the drum 21 and presses thereagainst with the web or chain of wrappers traveling between the belt and the drum. In this way the adhesive joints between adjacent wrappers may be firmly held in place while the adhesive cools from its activation temperature and sets.

Upon leaving the belt 26 and drum 21 the chain of wrappers may travel through an additional set of feed or pull rollers 28 and thence the wrappers move in the direction of the arrow indicated by the numeral 30 in Fig. 2 to an additional station where they may be wound or coiled on a suitable reel to the size desired as a supply roll of wrappers for the wrapping mechanism. The rewinding mechanism being conventional in the art is merely indicated by the legend "To Rewind Mechanism." If desired, the web shown as passing through the mechanism illustrated in Fig. 2 may be of such a transverse width that two or more chains of wrappers may be simultaneously produced. Such multiple chains may then be advanced through mechanism which slits the chains into pairs or single widths which may be wound to form a supply roll. These slitting operations may be accomplished in connection with the rewinding mechanism or may be separately done after the chains have been rewound and completely passed through the apparatus in Fig. 2.

The apparatus in Fig. 2 describes the use of a plurality of sets of feed or pull rolls at frequent intervals. This is done to facilitate maintaining registry throughout the travel of the web and offset any effects or resistance incurred during the operations performed at any particular station. Also, it will be understood that the sequence of stations shown in Figs. 1 and 2 is for purposes of illustration and such sequence may be varied according to the nature of the fabrication to be performed and as may be desired for convenience or other reasons.

Figure 5:
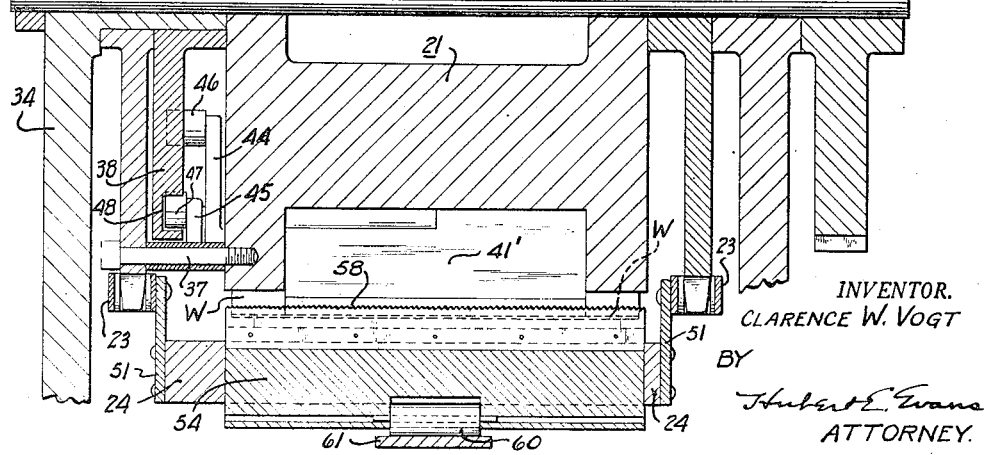
Fig. 5 is an elevational view, partially in section, taken substantially on line 5—5 of Fig. 3 to illustrate details of the mechanism shown in Fig. 3.

Figs. 3, 4, and 5 illustrate in semi-diagrammatic form, one mechanism which may be used to accomplish the defining of the web into individual wrappers and the chaining of such wrappers. In Fig. 3 the roll 17 with its heated sections 18 is shown as mounted on a shaft 31 which may be driven in any desired manner (not shown) in synchronization with the balance of the mechanism. The heated sections 18 are indicated as comprising resistance heater cartridges to which electricity may be supplied from any suitable source through wires 32, by slip rings or other similar well known means.

The drum or rotor 21 is shown in Fig. 5 as being keyed to and driven by a shaft 33 which may be journaled in and supported by stationary bearing and frame members 34. A driving gear 35 is also keyed to the shaft 33 and may mesh with and be driven by other gears which operate in synchronization with the balance of the apparatus. The sprocket 25 is mounted adjacent the drum 21 and is keyed to the shaft 33 so that upon rotation of the shaft it will drive one of the chains 23 in timed relation with the drum, the diameter of the sprocket being such that its pitch line is of equal diameter with the normal periphery of the drum. The other similar sprocket 25' for driving the other of the chains 23 is mounted for rotation on a sleeve extension 36 of one of the frame members 34 and to drive this sprocket in timed relation with the drum, bolts 37 pass through the sprocket and are threaded into the drum as may be seen in Fig. 5. Between the sprocket 25' and the drum, and radially inward of the bolts 37, is a plate or disk member 38 which is mounted on and secured to the sleeve 36 of the frame member 34 such as by one or more set screws 40. Thus, the member 38 may remain stationary while the shaft 33, the drum 21, and the sprockets 25 and 25' rotate.

Disposed around the periphery of the drum and forming the central portion of such periphery, are a plurality of pairs of pivotally mounted sections or gate members 41 and 41', each pair of which extend toward each other from spaced pivot points and operate to modify the normal periphery of the drum causing deviation of the web to produce the material desired for the overlap between adjacent wrappers. This deviation from the normal periphery of the drum may be accomplished in various ways. For example, recesses extending inwardly from the normal periphery might be provided and the web caused to deviate by lining or conforming to such recesses. In the form of the invention shown in the drawings, the gate sections 41 and 41' pivot radially outward to form protuberances or projections extending from the normal periphery.

As viewed in Figs. 3 and 4, the drum rotates in a clockwise direction and the leading one of each pair of gate members is indicated by the numeral 41 while the trailing one of each pair of gate members is indicated by 41'. Each gate member 41 of one pair is mounted for rotation about an axis which coincides with the axis of rotation for the gate member 41' of the next adjacent pair of gate members. As shown in the upper portion of Fig. 5 each of the gate members 41 are provided with an aperture portion which is received on and may be secured to a hollow sleeve member 42. These sleeve members 42 extend from one side of the drum and may be journaled in the outer side portions thereof. Disposed within each sleeve member 42 and journaled for rotation therein is a pin 43. Each pin 43 extends from side to side of the drum and has one end journaled in a side portion of the drum and its opposite end journaled in one of the sleeve members 42. The gate member 41' is mounted on and secured to pin 43 and by this construction the gate members 41 and 41' are capable of simultaneous pivotal movement in opposite directions about the same axis, independently of each other. Each of the sleeves 42, carrying a gate member 41, is provided at one end with an oscillating lever arm 44 while each of the pins 43 carrying a gate member 41', is secured to an oscillating lever arm 45.

The lever arms 44 and 45 are provided at their outer extremities with rollers 46 and 47 respectively, which rollers are adapted to be received in and actuated by a cam track 48 formed in the stationary member 38 disposed adjacent the drum. The cam track 48 as may best be seen in Fig. 3 veers outwardly with respect to the shaft 33 for a portion of its annular extent and as may be seen at the right hand portion of the drum in Fig. 3, the cam track 48 has caused roller 47 to oscillate the arm 45 and move the gate member 41' radially outward to a position where it, in conjunction with its mating gate member 41, forms a protuberance from the normal periphery of the drum. At this point it may be seen that the mating gate member 41 has previously been activated through its associated lever arm 44 and roller 46 by the cam track 48 so that it is in its protruding position.

As may be seen in Fig. 3 it is at approximately this point that the web is fed adjacent the periphery of the drum 21 from the roll 17. To assist in maintaining registry of the web while it is being fed around the drum and during the operations of severance, overlapping, and adhering, the drum may be provided with a plurality of pins or projections 50 disposed exteriorly of the gate members 41 and 41' and adjacent the side edges of the web (see Fig. 5).

Suspended between the chains 23 and carried thereby are the block members 24 which assist in the functions of cutting, overlapping and securing the web. Figs. 4 and 5 show that the block members 24 are carried from the chains by plates or links 51. Mounted for movement relative to each of the block members 24 are presser elements 52 and 53 and a cutter block 54. The presser elements 52 and 53 are shown as strips or plates which extend for at least a distance equal to the length of the adhesive stripes 5, and function to contact the web and hold or support it with respect to the gate members 41 and 41' of the drum to facilitate severance.

These presser elements 52 and 53 are moved into engagement with the web as the chains 23 carry the blocks 24 closely adjacent the periphery of the drum. If desired, the movement of the presser elements may be controlled by any suitable mechanism such as a stationary cam track or cams and links. The drawings illustrate this movement diagrammatically as being achieved by springs 55 which are connected at one end to the presser elements 52 and 53 and at their opposite ends to the members 24 to resiliently urge the presser elements into engagement with the web. It is believed desirable that the presser elements be heated to insure that the adhesive stripes 5 are activated to tacky condition and will securely adhere together the overlapped marginal edges of individual wrappers.

For this purpose heater elements have been indicated by the numeral 56 and may be heated in any desired manner. The drawings show wires 57 extending from the heater elements to provide a source of electricity which may be fed to the heater elements through slip rings or other similar means. It may be possible to activate the adhesive stripes 5 by the use of heat applied by the presser elements 52 and 53 alone, or by the heated sections 18 of the roll 17 alone, or by a combination of both. This will depend on the type of thermoplastic adhesive used and the length of time required to activate it.

If the thermoplastic adhesive is of the delayed action type, which means that it will remain tacky for an appreciable time period after it has been heated to activation temperature, and in spite of the fact that it may have cooled below the activation temperature, the heating of the adhesive may be done prior to the overlapping and adhering together. However, it may be considered desirable to use an adhesive of the type which will not retain tackiness except at its activation temperature and in this instance the application of heat by the presser elements is essential. Even though the adhesive is preheated, such as while on the roll 17, it may be desirable to provide heat for the presser elements 52 and 53 to prevent undue cooling of the adhesive during severance and overlapping. It has been found that some adhesives may be overheated without adversely affecting their tackiness. In this event, the adhesive area may be preheated to a point sufficiently above the activation temperature to permit moving the adhesive before the adhesive cools below its activation temperature or loses its tackiness.

Each of the cutter blocks 54 is an elongated member movable with respect to the block 24 and extending at least for the full width of the web. At its upper portion the blocks 54 carry cutter blades 58 and as shown in Fig. 5 the cutting edgs of these blades may be provided with suitable serrations to improve the accurate severance of the web or to facilitate severing the web. Along its lower edge each cutter block 54 may be provided with a roller follower 60 which at the appropriate time may contact a stationary cam 61 (see Figs. 3 and 5) which causes the cutter blocks to move radially inward toward the drum and bring the blades 58 into contact with the web. It may be noted that as the blade 58 engages and cuts the web, the elements 52 and 53 support or hold the web at spaced points on opposite sides of the line of cut.

If desired, the cutter blocks may be returned to their normal position, after it leaves the influence of the cam 61, by compression springs 62, each having one end bearing against the block 24 and its other end bearing against the cutter block 54. If a more positive return action is desired the roller followers 60 may be constructed so that they engage a closed cam track which will both advance and retract the cutter blades 58.

At the lower portion of the drum 21 in Fig. 3, a cutter blade 58 is shown at approximately the point where it enters and severs the web and it will be noted that the point of severance is made as shown in Fig. 1 adjacent the adhesive stripe 5. After the cutter blade has retracted from its severing position the cam track 48 veers inwardly with respect to the axis of rotation of the drum and moves the leading gate member 41 inwardly. The presser element 52 which has been holding the web to the gate member 41 under the action of the spring 55, moves inwardly and retains the marginal edge of the cut wrapper in contact with the gate member 41. Following this action the trailing gate member 41' of the pair in question, under the influence of the cam track 48, moves inwardly and the presser element 53 associated therewith causes the margin of the web adjacent the line of severance to follow the inward movement of the gate member 41'. The movement of the gate members 41 and 41' to their position where they return to the normal periphery of the drum 21, effects an overlapping of the marginal edges adjacent the line of severance and with the adhesive stripe 5 activated to tacky condition these marginal edges will be adhered together. Fig. 4 illustrates the point in the operation immediately prior to the overlapping and adhering together of such marginal edges.

The presser elements 52 and 53 may be so dimensioned and positioned that they move in a direction tending to slightly pull the marginal edges together and obtain the full amount of the overlap. This pull is resisted by the web being held on the index pins 58 which are located on each side of the line of severance. Further, as may be seen from Fig. 4 the presser element 53 in following its associated gate member 41' overlies the adhesive stripe 5 and overlapped marginal edges to assist in securing them together. Further, the heating of the presser element 53 will insure that the adhesive stripe 5 is activated to tacky condition to obtain adherence. While it may not be necessary to heat the presser element 52, since it does not immediately contact portions of the web which are adhesively coated, this does serve to heat the surface against which the adhesive is to be applied.

As previously described, after the overlapping and adhering together of the marginal edges adjacent the severance line, this joint may be further treated to insure adherence by the endless belt 26 which will serve to press the overlapped portions together and hold them while a firm bond is being established. Following this the chained wrappers may leave the periphery of the drum 21 and as shown in Fig. 2, may be advanced to winding and/or slitting operations.

It may be seen that one of the important advantages of the present invention is that enwrapments may be fabricated or imprinted and then defined and chained so that they are prepared in advance for use. It is considered especially beneficial that they be connected in a series or chain to facilitate their advancement to a predetermined position where they may be readily separated or detached.

Further, since such articles are generally fed through a printing mechanism under present day practices, the fabrication, defining and chaining may be accomplished without appreciably increasing the cost of the articles. At the same time by the prefabricating and chaining of enwrapments, packaging apparatus and methods may be simplified and substantial savings of time and expense in packaging may be made, without any sacrifice in the quality or appearance of the finished package. In fact, the precise registry obtained by the use of the present invention will provide a superior enwrapment both from the standpoint of appearance and ease of use. In addition to the savings accruing in the costs of packaging by enwrapments produced in accordance with the present invention, the savings in the amount of material required for the enwrapments, due to their being maintained in registry during fabrication and use, will amount to large savings in the cost of enwrapments, particularly where the production volume is high.

It is also considered to be of primary significance that the present invention may be accomplished by only slight modification of the several existing commercial printing machines through which enwrapments must be passed under present day practices in order to apply printed matter or advertising thereto.

While the drawings and description herein have emphasized the use of the present invention in connection with enwrapments and particularly wrappers, the features and principles have application to a number of other articles. By way of illustration, a great many articles, similar to enwrapments in that they may be formed of sheet material, may be connected in a series to facilitate handling or using of such articles. It is contemplated that sections of sheet material of varying thicknesses, boxes, cartons, folders, frames, liners, bands, labels, match box covers, etc., may be advantageously disposed in a series with a detachable connection provided therebetween. For the purposes of the present application the term enwrapments includes the variety of relatively flat items to which the present invention may be applicable.

Further, the terms imprint and fabricate as used in the present application denote the treatment and preparation to which these articles may be subjected, including the incorporation or application of many features of construction, certain of which have been fully described. Examples of these are, the incorporation of printed matter, designs, advertising material, reinforcing elements, perforations, registry indicia, and the previously described aids to packaging.

As stated, the sequence of the operations which may be performed as described in connection with Figs. 1 and 2 may be varied according to the requirements or results desired from the use of the present invention. In some cases it may be desirable to accomplish the chaining of the articles prior to their fabrication. For example, the individual articles may be connected into a series or chain which will facilitate their advancement through suitable printing machinery. In this way the articles may be handled as a web rather than as individual sheets or pieces and yet may be readily separated when desired. If the detachable connection between the individual articles is of the type shown in the drawings in which overlapped marginal edges are secured together, it may be necessary to provide for the additional thickness at this seam. The rolls through which the chain passes, or other contacting elements, may be separated or relieved to permit passage of the overlap without disturbing the printing or registry where thickness of the overlap might be objectionable in passing through the mechanism. In the case of thinner sheet materials no such provision may be required. Further, it may be desirable to accomplish the chaining in a manner which will not effect any variation in the thickness of the chained articles.

It will be understood that the foregoing description of preferred embodiments of the invention is for the purpose of explanation and illustration and numerous variations and modifications other than those which have been described may be made without departing from the spirit of the invention.

What I claim is:

1. Apparatus for producing a connected series of individual articles from a web which comprises a member movable in an endless path, means to advance a web to said endless path, a plurality of juxtaposed elements carried by the member, means to mount the elements movably in a retracted position on the movable member, means to move the juxtaposed elements to cause them to project outside the endless path, means cooperating with the movable member to sever the web between the juxtaposed elements, means operated in timed relation to the movable member to actuate the web severing means while the elements project outside the endless path, means to restore the elements sequentially to the endless path whereby adjacent portions of the severed web will overlap, and means to press the overlapped portion of the web together.

2. A device, according to claim 1, wherein the movable member comprises a rotary drum.

3. A device, according to claim 1, wherein the juxtaposed elements comprise plates pivotally mounted on the movable member.

4. A device, according to claim 1, wherein the severing means comprises a cutter blade and presser feet yieldably mounted upon opposite sides of the blade, and means carried by the movable member to move the severing means in time relation therewith.

5. A device, according to claim 4, wherein the presser feet press the web against the juxtaposed elements.

6. A device, according to claim 1, wherein there is provided a second movable member movable in a second endless path a portion of which is coincidental with the first endless path, and wherein the severing means is mounted on the second member, and means to move the second member synchronously with the first movable member.

7. A device, according to claim 6, wherein yielding presser feet are mounted upon opposite sides of the severing means and are adapted to engage the web and press the same against the juxtaposed elements during the travel of the second member coincidentally with the first movable member.

8. A device, according to claim 1, wherein means is provided on the movable member to prevent movement of a portion of the web with respect to the said member.

CLARENCE W. VOGT.

References Cited in the file of this patent

UNITED STATES PATENTS

| Number | Name | Date |
|---|---|---|
| 852,429 | Gauch | May 7, 1907 |
| 893,227 | Davies | July 14, 1908 |
| 1,058,658 | Caulfield | Apr. 8, 1913 |
| 1,668,044 | Burgdorf | May 1, 1928 |
| 1,836,043 | Schmidt | Dec. 15, 1931 |
| 1,943,264 | Snyder | Jan. 9, 1934 |
| 2,013,086 | Baker | Sept. 3, 1935 |
| 2,078,496 | Jaite | Apr. 27, 1937 |
| 2,139,039 | Salfisberg | Dec. 6, 1938 |
| 2,205,433 | Paulsen | June 25, 1940 |
| 2,272,251 | Robinson | Feb. 10, 1942 |
| 2,288,360 | Jensen | June 30, 1942 |
| 2,289,336 | Bamford | July 14, 1942 |
| 2,321,647 | Brougham et al. | June 15, 1943 |
| 2,335,431 | Meyer | Nov. 30, 1943 |
| 2,522,784 | Guilbert | Sept. 19, 1950 |